United States Patent [19]

Coupart

[11] Patent Number: 5,698,925
[45] Date of Patent: Dec. 16, 1997

[54] SLOTTED WOUND STATOR FOR AN ELECTRICAL ROTATING MACHINE, A METHOD FOR MANUFACTURING SUCH A STATOR AND A MACHINE COMPRISING SUCH STATOR

[75] Inventor: Eric Coupart, Angouleme, France

[73] Assignee: Moteurs Leroy-Somer, Angouleme Cedex, France

[21] Appl. No.: 591,654

[22] PCT Filed: Jun. 19, 1995

[86] PCT No.: PCT/FR95/00810

§ 371 Date: Mar. 7, 1996

§ 102(e) Date: Mar. 7, 1996

[87] PCT Pub. No.: WO95/35592

PCT Pub. Date: Dec. 28, 1995

[30] Foreign Application Priority Data

Jun. 17, 1994 [FR] France .................. 94 07472

[51] Int. Cl.$^6$ ........................................ H02K 1/06
[52] U.S. Cl. ................ 310/217; 310/89; 310/216; 310/254; 310/258
[58] Field of Search ..................... 310/217, 216, 310/218, 254, 258, 259, 58, 89, 42; 29/596, 597

[56] References Cited

U.S. PATENT DOCUMENTS

| | | | |
|---|---|---|---|
| 497,504 | 5/1893 | Stuart et al. | 310/217 |
| 1,156,639 | 10/1915 | Starker | 310/217 |
| 1,882,487 | 11/1932 | Dupont | 310/58 |
| 2,697,179 | 12/1954 | Wendel | 310/58 |
| 2,818,515 | 12/1957 | Dolenc | 310/254 |
| 4,085,347 | 4/1978 | Lichius | 310/259 |
| 4,485,320 | 11/1984 | Kawada et al. | 310/217 |
| 4,745,314 | 5/1988 | Nakano | 310/57 |
| 4,912,350 | 3/1990 | Parshall et al. | 310/217 |
| 5,091,666 | 2/1992 | Jarczynski | 310/54 |
| 5,497,544 | 3/1996 | Bien et al. | 29/596 |

Primary Examiner—Steven L. Stephan
Assistant Examiner—Tran Ngoc Nguyen
Attorney, Agent, or Firm—Young & Thompson

[57] ABSTRACT

Each stator lamination (2) is angularly offset with respect to the following adjacent lamination, about an axis (4) of the stator (1, 3), by a constant angle (α) equal to a multiple of the angle corresponding to the slot pitch, and has a square shape, each corner (5) being truncated to a circular outline (6). At least one of the two truncated corners (5) of each lamination (2) is linked to the corner (5) corresponding to each of the two adjacent laminations (2) by at least one welding point (11) located in a region where the two outlines (6) extend or are superimposed. The welding points (11) are located in predetermined respective angular positions cyclically reproducible in relation to the stator axis (4) and are uniformly distributed about the axis (4) so that the welding points (11) are aligned according to lines (15a, 15b) of welding points (11) substantially parallel to the stator axis (4).

23 Claims, 8 Drawing Sheets

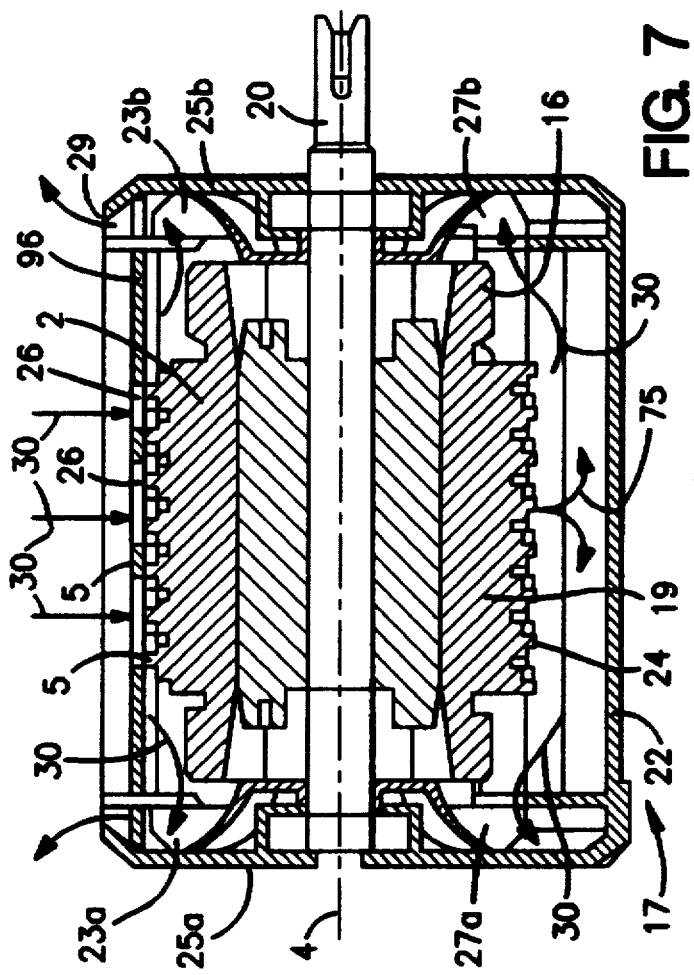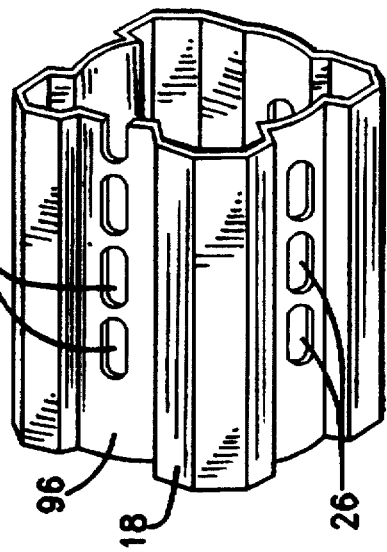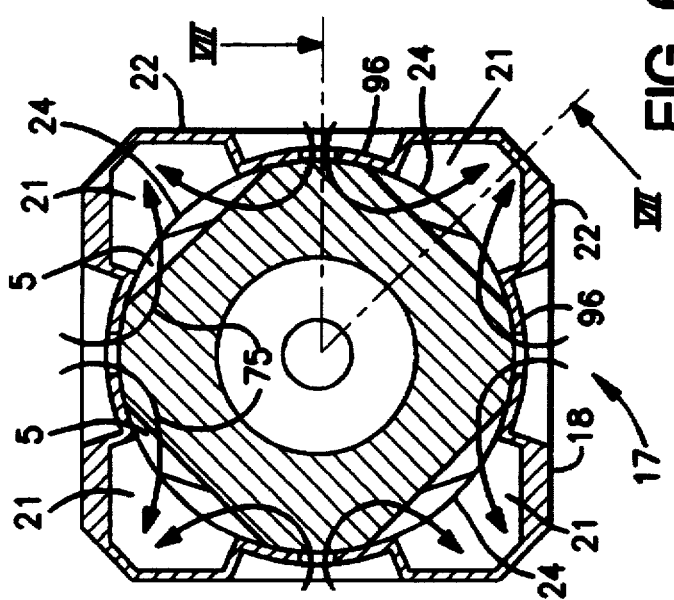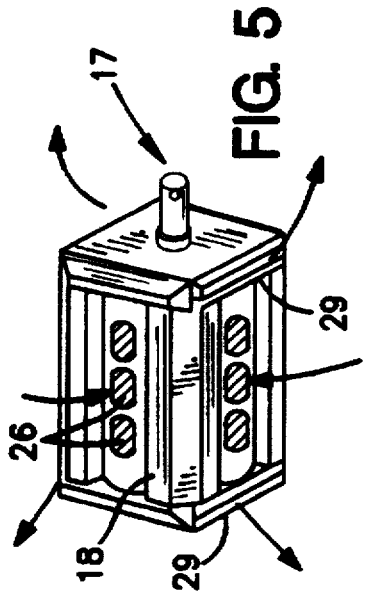

SLOTTED WOUND STATOR FOR AN ELECTRICAL ROTATING MACHINE, A METHOD FOR MANUFACTURING SUCH A STATOR AND A MACHINE COMPRISING SUCH STATOR

FIELD OF THE INVENTION

The present invention concerns a slotted wound stator for an electrical rotating machine and a method for manufacturing such a stator. It also concerns a machine comprising such a stator.

BACKGROUND OF THE INVENTION

In many electrical rotating machines, motors or current generators, the stator has a cylindrical outer shape, this stator consisting of disk-shaped plates piled up face-to-face and butt-jointed. This structure has certain disadvantages. First of all, since the plates are generally cut in a roll or a rectangular metal plate, the cutting of circular plates generates a significant loss of material. Secondly, this type of stator is difficult to cool externally since the exchange surface, consisting of the outer periphery of the stator, i.e. the edges of the plates placed face-to-face and butt-jointed, is very small with respect to the mass to be cooled.

Stator structures have been conceived in an attempt to eliminate these disadvantages. In general, each plate displays an angular displacement from the following adjacent plate, with respect to the axis of the stator, of a constant angle ($\alpha$) equal to a multiple of the angle corresponding to the pitch of the slots, each plate substantially having the shape of a regular polygon, more particularly of a square, each corner of which is truncated according to a circular contour, or approximately a circular contour, symmetrical with respect to the bisector of said corner, identical for all corners, and corresponding to the sector of a circle whose angle at the center is substantially equal to or greater than said angle ($\alpha$), the distance with respect to the axis of the stator and the shape of said contour being determined according to the angle ($\alpha$) so that, projected onto a plane perpendicular to the axis of the stator, the contour of a plate substantially prolongs the contour of a successive adjacent plate or is partially superposed on said contour.

Such structures make it possible to reduce the losses in magnetic material when cutting the plates, to increase the equivalent magnetic diameter of the pack of magnetic plates, and to improve the cooling of the stator by forcing the air to pass transversally through the spaces provided between the corners, spaced apart from one another, of the plates having identical positions with respect to the axis of the stator.

Despite these significant advantages, such structures are not used industrially, mainly due to the inability to connect the plates to one another in a simple and reliable manner so as to be able to handle the pack of plates thus formed with full safety during all of the assembly phases of the stator and then of the motor.

Indeed, the magnetic plates are very thin, and their various corners, shifted with respect to another, do not support and protect one another: they are therefore exposed and can be very easily deformed, distorted, damaged, upon the slightest shock or during handling.

SUMMARY OF THE INVENTION

The object of the present invention is to eliminate the disadvantages of known stator structures and to provide for a structure of the type previously mentioned in which the shifted plates are connected to one another in a simple and reliable manner, as well as a method for manufacturing such a stator, and an electrical rotating machine including such a stator.

According to the invention, the stator of the type previously mentioned is characterized in that at least one of every two truncated corners of each plate is connected to the corresponding corner of each of the two adjacent plates by at least one weld point located in a place where the two contours are prolonged or superposed, the weld points being located in predetermined and cyclically reproducible respective angular positions with respect to the axis of the stator and being distributed in a substantially regular fashion about the axis so that the weld points are aligned along lines of weld points substantially parallel to the axis of the stator.

At least one of every two and preferably each of the two truncated corners of each plate is thus fixed by two weld points to the respective corresponding corners of the preceding plate and of the following plate in the pack of plates.

Experience has shown that these weld points are sufficient to provide each plate corner with enough rigidity, within the pack of plates, to make it possible to handle said pack during the various operations involved in the successive assembly phases of the stator, and then of the motor.

This is all the more true since the angle $\alpha$ of angular displacement of two adjacent plates has a lower value equal to the product of the angle corresponding to the pitch of the slots multiplied by a small integer.

Thus, for a plate cut in a square, each plate is connected to an adjacent plate by at least two, and preferably four, weld points.

Furthermore, the pack of plates is not rigidified by these separate weld points. On the contrary, this pack of plates is capable of slightly stretching in an accordion-like manner if a traction is exerted on its two axial ends, each plate, or each corner, becoming slightly deformed between the weld points to enable each plate to move slightly apart from the adjacent plates.

Nevertheless, the pack of plates returns to its initial shape as soon as this traction stops and has, in the absence of such a traction, a shape sufficiently stable to allow the stator to be assembled in a safe and reliable manner.

Finally, it is very easy to connect, by a weld point, the corners of two magnetic plates which are prolonged or superposed, due to the very low thickness of these plates, insofar as this weld point is not intended to support significant and/or repeated stress.

According to another aspect of the invention, the method for manufacturing a stator according to the first aspect of the invention comprises the following successive steps:

cutting plates having substantially the shape of a regular polygon, particularly a square, each corner of which is truncated according to a predetermined contour;

piling up the plates face-to-face shifting each plate from the previous plate by a constant angle ($\alpha$).

According to the invention, this method is characterized in that at least one of every two truncated corners of each plate is connected to the corresponding truncated corner of each of the two adjacent plates by at least one weld point.

According to a preferred version of the invention, the pressing of the plates against each other is ensured by the insulating sleeves at the bottom of the slots of the stator.

The purpose of these sleeves is to insulate the plates of the stator from the windings installed within these slots. The plates are held pressed against each other on account of the pressing of the sleeves between the windings and the inner wall of the stator, of the significant number of sleeves carried by the stator and of the contact between the sleeve ends and the end plates of the pack of plates. Indeed, the ends of the insulating sleeves are typically folded back towards the pack of plates each exerting on the latter a pressing effect.

The invention also concerns an electrical rotating machine.

This machine is characterized in that it comprises a stator according to the invention.

According to an advantageous version of the invention, the machine comprises means forming, on the periphery of the stator, longitudinal channels substantially parallel to the axis, these channels being open on the stator side and furthermore communicating directly with a cooling fluid inlet or outlet.

The shift of the plates results in certain parts of the edge of the plates, the protruding parts, not being covered by the contiguous plates as mentioned above. The arrangement of the channels on the periphery of the stator as previously mentioned makes it possible to force a cooling fluid, particularly air, to circulate between these protruding parts, along a transversal direction tangent to the periphery of the stator and substantially parallel to the plates.

According to a preferred version of the invention, at least certain channels are in direct communication with the fluid inlet or outlet through at least one end of the channel.

According to a preferred version of the invention, the channels are spaced apart from one another.

According to a preferred version of the invention, the portion of the stator located between two immediately neighboring channels is at least partially in contact with the ambient medium of the machine.

The cooling fluid thus circulates at each passage inside a single channel, passing beneath the wall of the channel between two protruding portions of the plates, being sucked in or rejected. The path of the cooling fluid is then particularly short.

According to another preferred version of the invention, the channels are adjacent and the channels of a first group and the other channels, making up a second group, are in direct communication with a cooling fluid inlet and outlet, respectively.

In this case, the fluid enters through a channel and exits throughout an adjacent channel passing beneath the wall of the channel between the protruding portions of the plates.

According to a preferred version of the invention, the channels communicate through a first end with said inlet and outlet, respectively, and they are sealed at a second end opposite to the first end.

It is, for example, possible to make the sealed ends of contiguous channels occupy opposite positions along the axial direction of the stator.

According to a preferred version of the invention, at least one portion of the wall of the channels consists of the wall of the housing.

For example, the channels can be configured so that the face of the channels opposite to the stator consists of the wall of the housing. The installation of an additional wall is thus avoided. This promotes the thermal exchange between the fluid inside the channel and the housing's exterior. Material saving is also achieved.

According to an advantageous version of the invention, the cooling fluid outlet is associated with fluid depression means.

Indeed, for many configurations of the outer cooling fluid of the housing, it is observed that the putting into circulation of the fluid, particularly air, is achieved more efficiently by creating a depression rather than an excess pressure. This is particularly true for the circulation in the channels mentioned above.

BRIEF DESCRIPTION OF THE DRAWINGS

Further characteristics and advantages of the invention will be more clearly understood upon reading the description which follows of several preferred embodiments, made with reference to the attached drawings provided as examples on a non limiting basis:

FIG. 5 is a perspective view of a first embodiment of the machine according to the invention;

FIG. 6 is cross sectional view of the machine of FIG. 5;

FIG. 7 is a longitudinal sectional view along planes VII—VII of the machine of FIG. 6;

FIG. 8 is a perspective view of the housing of the machine of FIG. 5;

DETAILED DESCRIPTION OF THE PREFERRED EMBODIMENT

Figure 1:
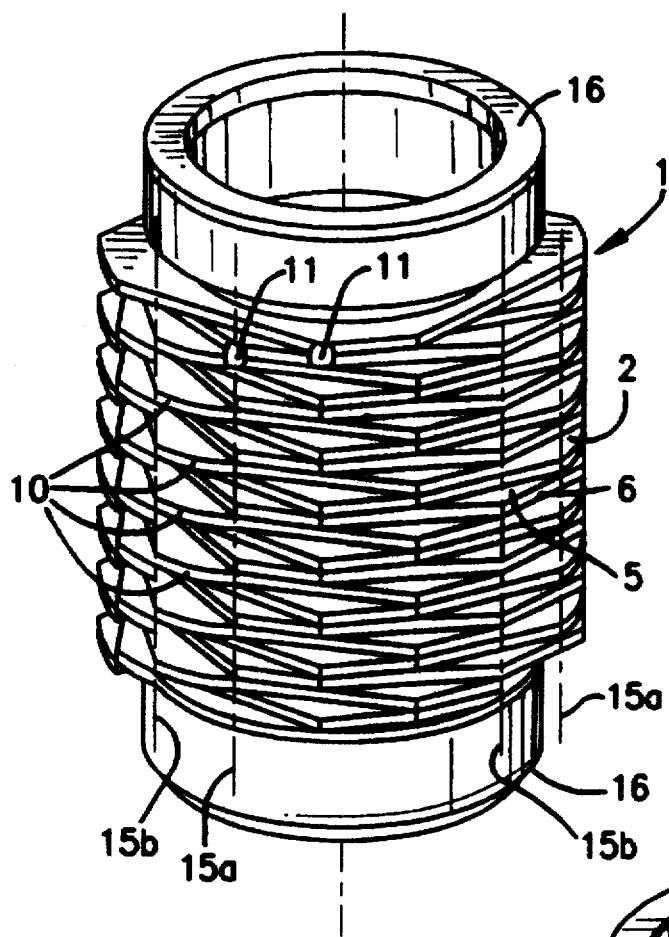
FIG. 1 is a perspective view of a first embodiment of the stator according to the invention.
Figure 2:
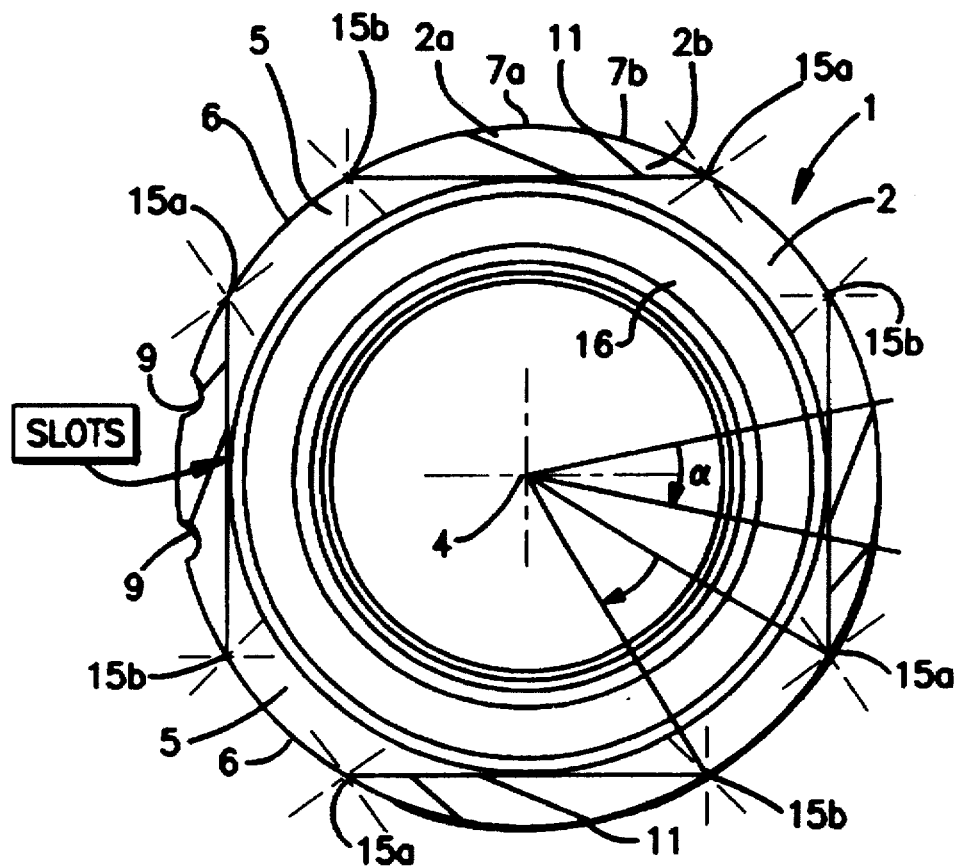
FIG. 2 is an axial view of the stator of FIG. 1.

FIGS. 1 and 2 show a slotted wound stator 1 for a rotating electrical machine, according to the invention. This stator is part of a motor but it could also be a stator for a current generator.

The stator 1 consists of metal plates superposed face-to-face 2. However, the stator can alternatively consist of superposed groups of two metal plates superposed face-to-face and butt-jointed. The description which follows for the plates is therefore equally valid alternatively for groups of two plates. The groups can include more than two plates. The effect of increasing the equivalent magnetic diameter diminishes when the number of plates per group is increased. The thermal exchange surface between the plates and the cooling fluid also diminishes under these conditions. In these two cases, the plates or the groups are substantially identical to one another.

The plates 2 have the general shape of a regular polygon. In the present example, this polygon is a square. On each plate 2, each of the parts farthest removed from the axis 4 of the stator, in this case each of the four corners 5 of the plate 2, is truncated according to a predetermined contour. Here the edge 6 of each corner 5 has substantially the shape of the arc of a circle centered on axis 4. The radius of this circle for each corner 5 is identical for all the plates. Here this radius is even identical for all of the corners 5 of the plates.

Each plate 2 is shifted a constant angle α along the axis 4 of the stator with respect to the previous plate. The measure of this angle is substantially different from a multiple of 45°.

In addition, the measure of this angle α is a multiple of a fraction of 360° and one can further choose this measure so that this measure of the angle, expressed in degrees, is a multiple of 360/number of slots of the stator. In the present example, the angle α is 22.5° and fulfils these conditions.

For each corner 5 of the plates 2, the radius of the circle mentioned above making up the edge 6 is substantially greater than the radius of the circle geometrically inscribed in the square periphery of the plates. In addition, this radius is sufficiently small so that, on any of two successive plates 2a and 2b, the homologous arcs of a circle 7a and 7b are prolonged or superposed and make up an arc of a circle substantially continuous according to an axial view of the stator, i.e. projected onto a plane perpendicular to the axis 4, as in FIG. 2.

In the embodiment of FIG. 2, a very thin separation 11 can be observed between two homologous arcs of a circle 7a, 7b.

Figure 3:
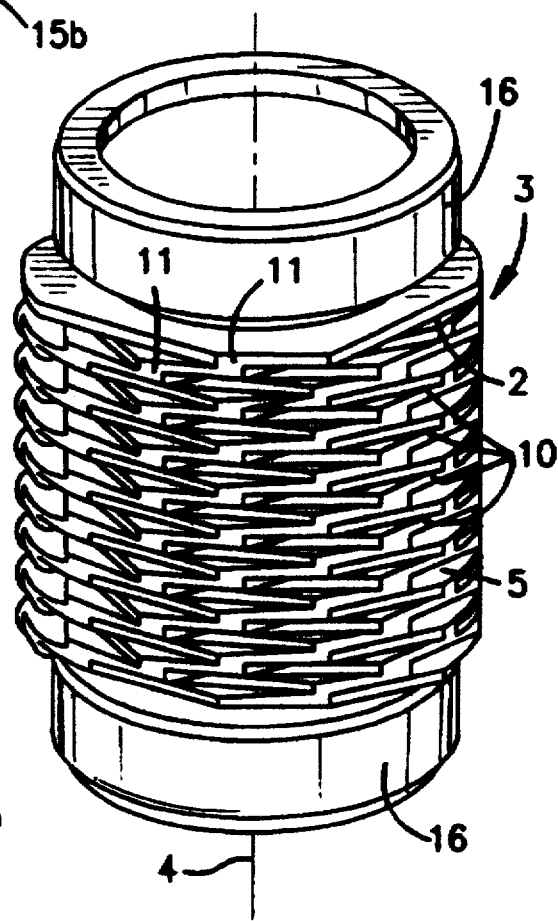
FIG. 3 is a perspective view of a second embodiment of the stator according to the invention.
Figure 4:
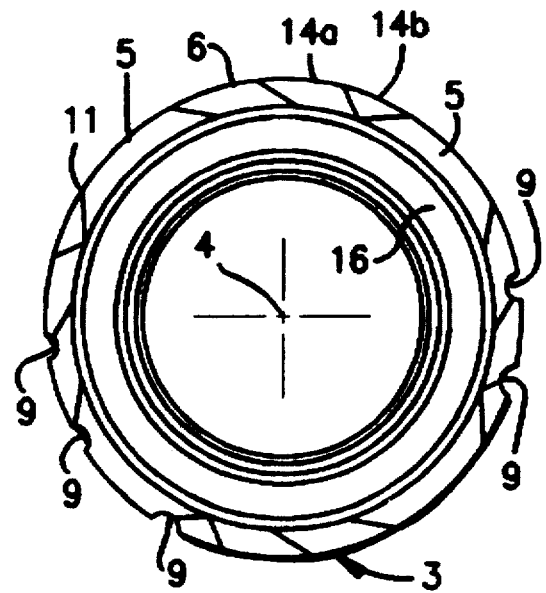
FIG. 4 is an axial view of the stator of FIG. 3.

FIGS. 3 and 4 show another embodiment of the stator according to the invention. In this embodiment, the stator 3 is identical to the previous one except that the radius of the circle making up the edge 6 of the corners 5 of the plates is smaller than in the previous embodiment. As a result, the arcs of a circle 14a, 14b making up the edge 6 of the corners 5 of the plates partly overlap mutually two-by-two and all together form a continuous circle according to an axial view of the stator as shown in FIG. 4.

Referring to FIGS. 1 and 3, the shift of the plates 2 by a constant angle α therefore gives the stator 1 a generally cylindrical shape, the angles a of the shifted plates creating blades 10 on the periphery of the stator. For plates with a generally square shape shifted 22.5° with respect to one another, there are four blades 10.

It is due to the overlapping described above that no line separating two adjacent corners in the region of said overlapping is drawn in FIG. 3, so as to clearly show the blades 10.

Once the piling up and the shifting of the plates has made it possible to form the pack of plates, the plates are connected to one another so that each plate or group of plates is fixed to the previous plate or group by at least two weld points 11 achieved on said arcs of a circle 7a, 7b or 14a, 14b.

Optionally, each plate can be slightly scalloped at each weld point 11, as shown at 9 in FIGS. 2 and 4: this makes it possible to eliminate any risk of the weld point 11 protruding outwards with respect to the cylindrical outer contour of the pack of plates formed by the circular edges 6 of the plates 2.

These weld points 11 can be achieved point-by-point. Nevertheless, it is advantageous to achieve them by setting up lines of weld points as in the method according to the invention of which one embodiment will be described below.

According to a preferred version of the invention, a method for manufacturing a stator according to the invention comprises several successive steps.

One step first consists of piling up the plates 2 face-to-face to form the stator 1 or 3 as described above. The following step consists of connecting at least one of every two truncated corners of each plate to the corresponding corner of each of the two adjacent plates by at least one weld point 11.

Figure 18:
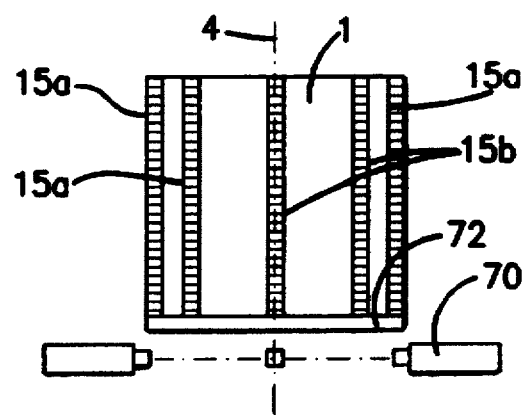
FIGS. 18 and 19 are front and plane views, respectively, schematically showing the plate welding operation in an embodiment of the method of the invention.
Figure 19:
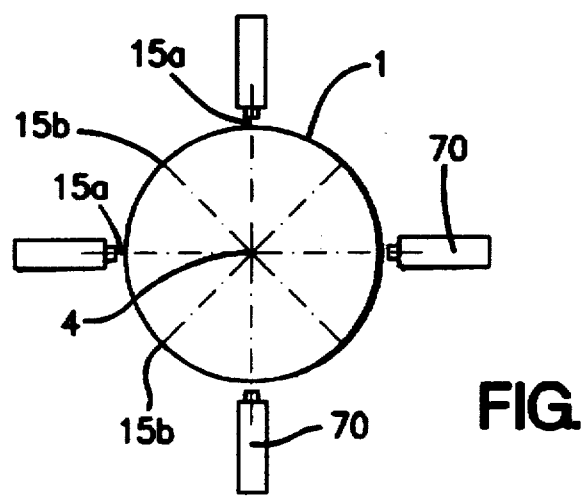
Figure 14:
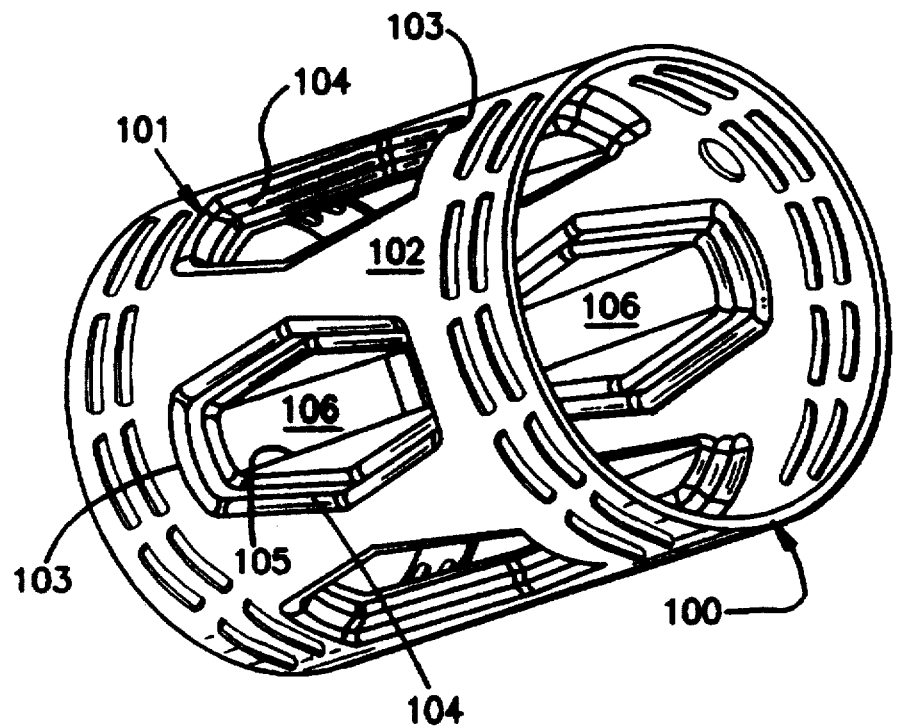
FIG. 14 is a perspective view of another embodiment of the housing of the machine according to the invention.
Figure 17:
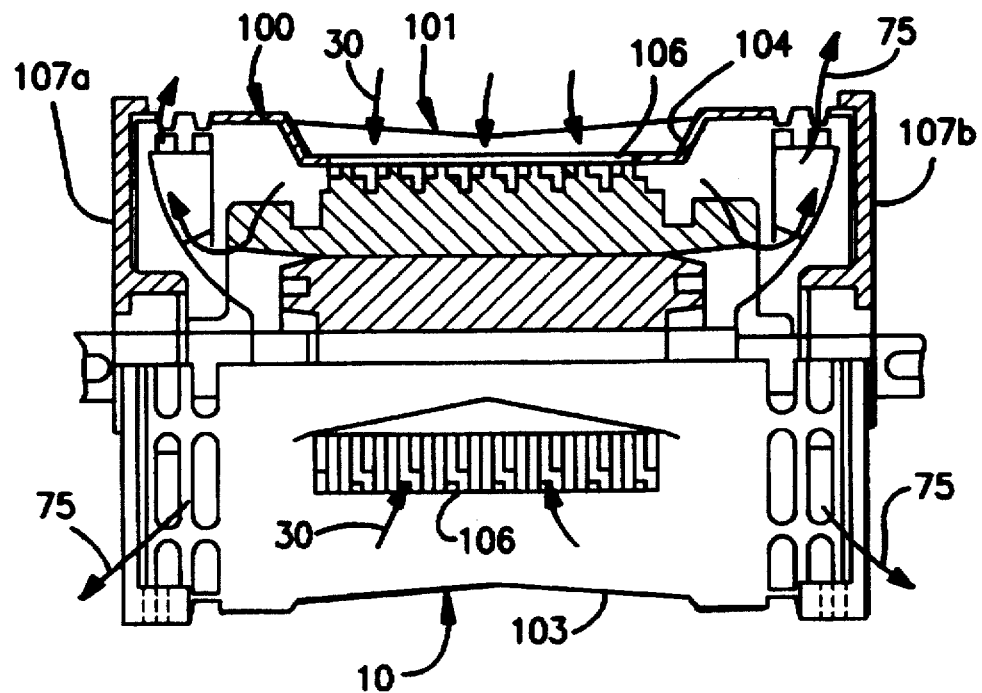
FIG. 17 is a view similar to FIG. 15, partially as a longitudinal section along XVII—XVII of FIG. 16, of a machine including a housing according to FIGS. 14 to 16.
Figure 15:
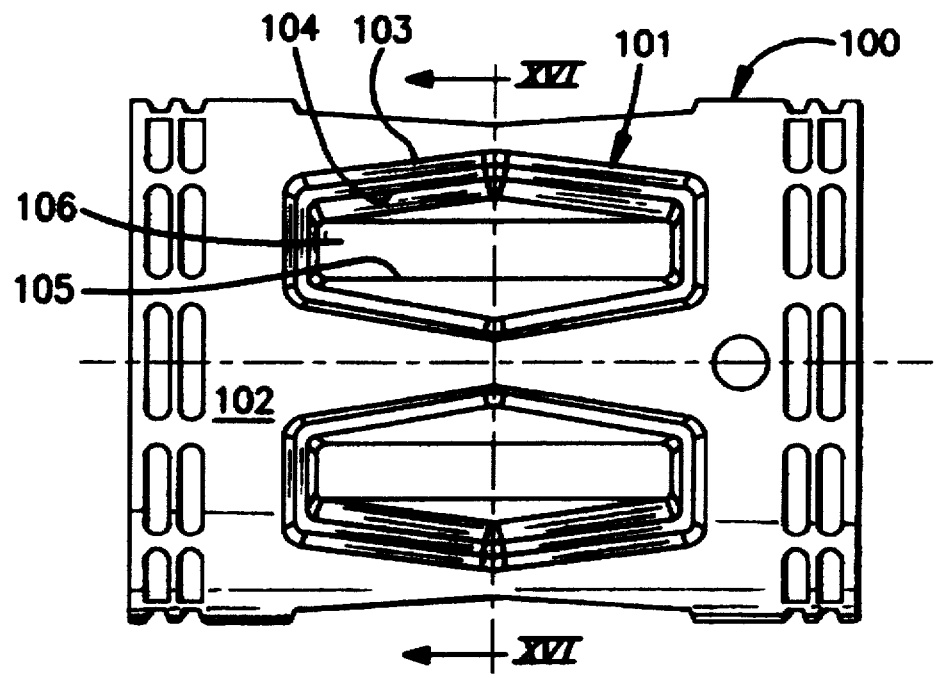
FIG. 15 is a front view of the housing of FIG. 14.
Figure 16:
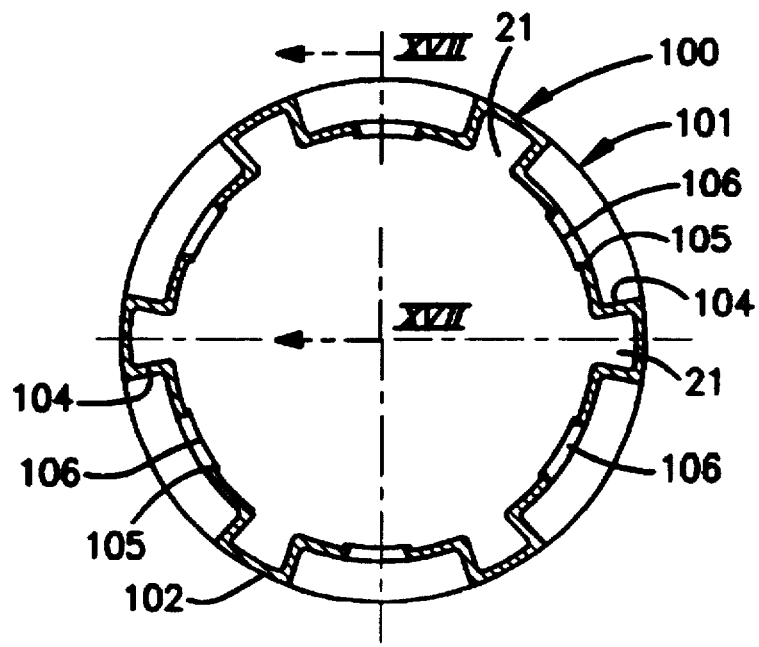
FIG. 16 is a cross sectional view along XVI—XVI of FIG. 15.

Referring to FIGS. 18 and 19, a following step consists of welding by displacing one of the activated welding heads 70 relative to the stator 1, at the surface of the stator 1, along continuous trajectories 15a, 15b substantially parallel to the axis 4. These trajectories 15a, 15b are arranged to weld at least one of every two truncated corners of each plate 2 by at least one weld point 11 to the corresponding corner 5 of each of the adjacent plates 2. Each plate is thus connected by at least two weld points to each of the adjacent plates. These trajectories 15a, 15b are shown for the present example as dot-and-dash lines in FIGS. 1 and 2.

The welding operation is carried out on a conventional machine having several mobile welding heads 70 simultaneously vertical with respect to a plate 72 on which the stator is disposed with its axis 4 vertical. The plate 72 is free to rotate about its axis. The machine includes a cylindrical chuck not shown which ensures the centering and indexing of the plates. It also comprises pressing means not shown making it possible to exert an axial stress on the pack of plates during the welding.

In the present example, the trajectories 15a, 15b are rectilinear and parallel to the axis 4 of the pack of plates. On account of the generally square shape of the plates and the value of 22.5° chosen for the angle α and assuming that one of every two corners of each plate is welded to the corresponding corners, there are eight trajectories 15a, 15b in FIGS. 18 and 19, which makes it possible to connect the contiguous plates by two weld points. In this case, the machine used for this operation has four welding heads 70.

In the preferred embodiment, in which each corner is connected by a weld point to the corresponding corner of the two adjacent plates, each plate is connected by four weld points to each of the two plates adjacent to it, and the stator has on its periphery sixteen trajectories or lines of weld points 15a, 15b, as shown in FIG. 2.

In the present example of FIGS. 18 and 19 and in general, when the number n of trajectories 15a, 15b is even, in this case eight, and twice that of the welding heads 70, in this case four, the method comprises the following successive steps:

welding by simultaneously displacing the n/2 activated heads 70 relative to the stator 1 at the surface of the stator along the n/2 first trajectories 15a;

removing the heads 70 from the axis relative to the stator 1;

displacing the heads 70 relative to the stator 1 rotating by a given angle β about the axis 4 of the stator;

bringing back the heads 70 up to the surface of the stator 1; and welding by simultaneously displacing the activated heads 70 relative to the stator 1 at the surface of the stator along the n/2 last trajectories 15b.

In this case the angle β is equal to the angle α and measures 22.5°. For sixteen trajectories, the four welding heads 70 travel two paths to-and-fro along the surface of the stator 1 or 3.

It is possible to make the heads 70 travel the first trajectories 15a in a first direction along the axial direction of the stator 1, performing an upward movement, and to travel the last trajectories 15b in the direction opposite to the first direction, performing a downward movement, for example. The rotation of the welding heads 70 relative to the stator is obtained by rotating the plate 72 the angle β, i.e. 22.5°, about its axis.

A machine with eight welding heads can also be used so as to place the eight lines of weld points on a single passage, or sixteen lines of weld points on two passages.

A following step of the method consists in axially pressing the plates 2 against each other from the axial ends of the stator 1 by suitable means. In this case, the pressing of the plates against each other is ensured by the insulating sleeves at the bottom of the slots of the stator, shown schematically in FIG. 2, which are well known in the field of electrical rotating machines, each sleeve extending along the entire length of the stator and having its free ends folded back towards the stator.

The windings are installed in the slots in a conventional manner. Referring to FIGS. 1 to 4, the end pieces 16 are then installed, these being conventional and not shown in detail. They contain the end windings of the stator 1. These pieces are actually only necessary in certain applications in which the end windings must be protected from the cooling fluid.

FIGS. 5, 6 and 7 show a machine, in this case a motor 17, comprising a stator identical to that of FIGS. 1 and 2. It could alternatively comprise a stator as that of FIGS. 3 and 4. This motor 17 includes a housing 18, shown in FIG. 8, a rotor 19 and an output shaft 20. The motor 17 has as its axis the axis 4 of the stator 1.

The motor 17 comprises forming on the periphery of the stator 1 four longitudinal channels 21 substantially parallel to the axis 4 and regularly distributed on the periphery of the motor 17 as shown in FIG. 6. The channels 21 are spaced apart from one another.

One portion 22 of the wall of the channels 21 consists of the wall of the housing 18 and the remaining portion 24 consists of the periphery of the stator 1. The channels 21 are thus open on the stator side.

The channels 21 are furthermore in direct communication with a cooling fluid outlet which in this case is air. They could also be in direct communication with a cooling fluid inlet. The channels 21 are in direct communication with the cooling fluid outlet through their two ends 23a, 23b, near the respective end flanges 25a, 25b of the motor.

Referring to FIGS. 5, 6 and 8, each portion of the stator located between two immediately neighbouring channels 21 is at least partially in contact with the ambient medium of the motor, in this case atmospheric air. For this purpose, the housing 18 has between two neighbouring channels 21 three traversing oval openings 26 through which the plates 2 of the stator 1 can be seen.

More specifically, the housing 18 shown in FIGS. 5 to 8 includes a peripheral surface having, in cross section, a substantially square shape which has four corner parts each forming the part 22 of a corresponding longitudinal channel 21.

Between two adjacent corner parts 22, the housing has a region 96 closer to the axis 4 and with a cylindrical inner shape whose inner diameter is very slightly larger than the outer diameter of the stator 1: as a result, the inner wall of these regions 96 is substantially tangent to the outer peripheral wall of the stator 1 and it includes the three previously mentioned openings 26.

The air outlet is associated with depression means. For this purpose, the motor 17 comprises two fans 27a and 27b contained inside the respective flanges 25a and 25b, rigidly joined to the axle 20 of the motor and communicating with openings 29 of the flanges 25a and 25b. The motor is arranged so that the fans 27a, 27b create a depression at the respective ends 23a, 23b of the channels 21.

Due to this depression, the ambient air enters the channels 21 through the oval openings 26, directly in contact with the plates 2 of the stator 1. Since the inner walls of the regions 96 are tangent to the stator, the air penetrating the stator or exiting from it through the openings 26 (arrow 30) is forced to circulate in a plane perpendicular to the axis 4 between the corners 5 of the plates 2 as shown by the arrows 75 of FIG. 6 to end up in the channels 21. The air circulates in the channels until the fans 23a and 23b and it is then rejected through the openings 29. The circulation of the air is shown by the arrows 75 and 30.

Figure 9:
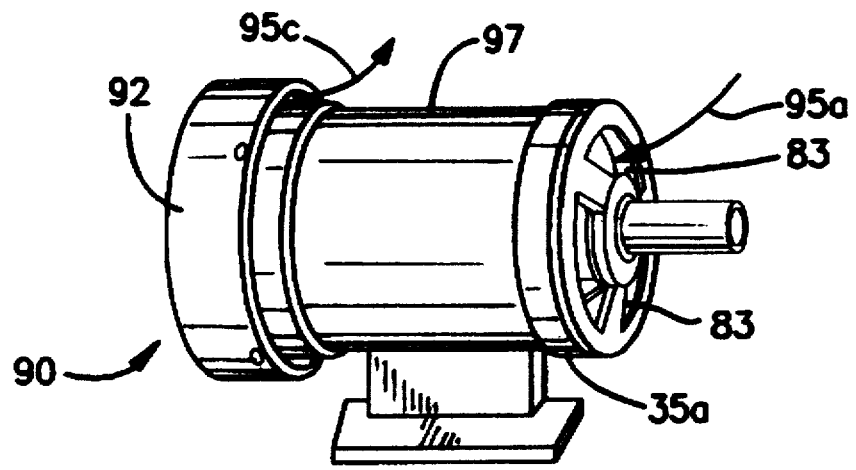
FIG. 9 is a perspective view of a second embodiment of the machine according to the invention.
Figure 10:
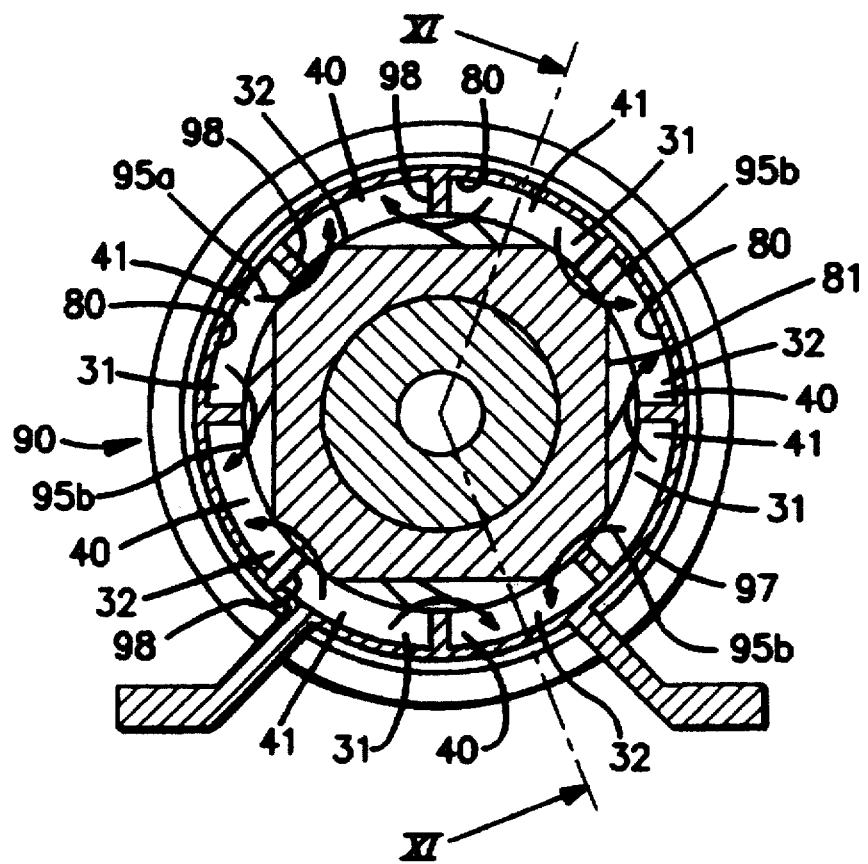
FIG. 10 is cross sectional view of the machine of FIG. 9.
Figure 11:
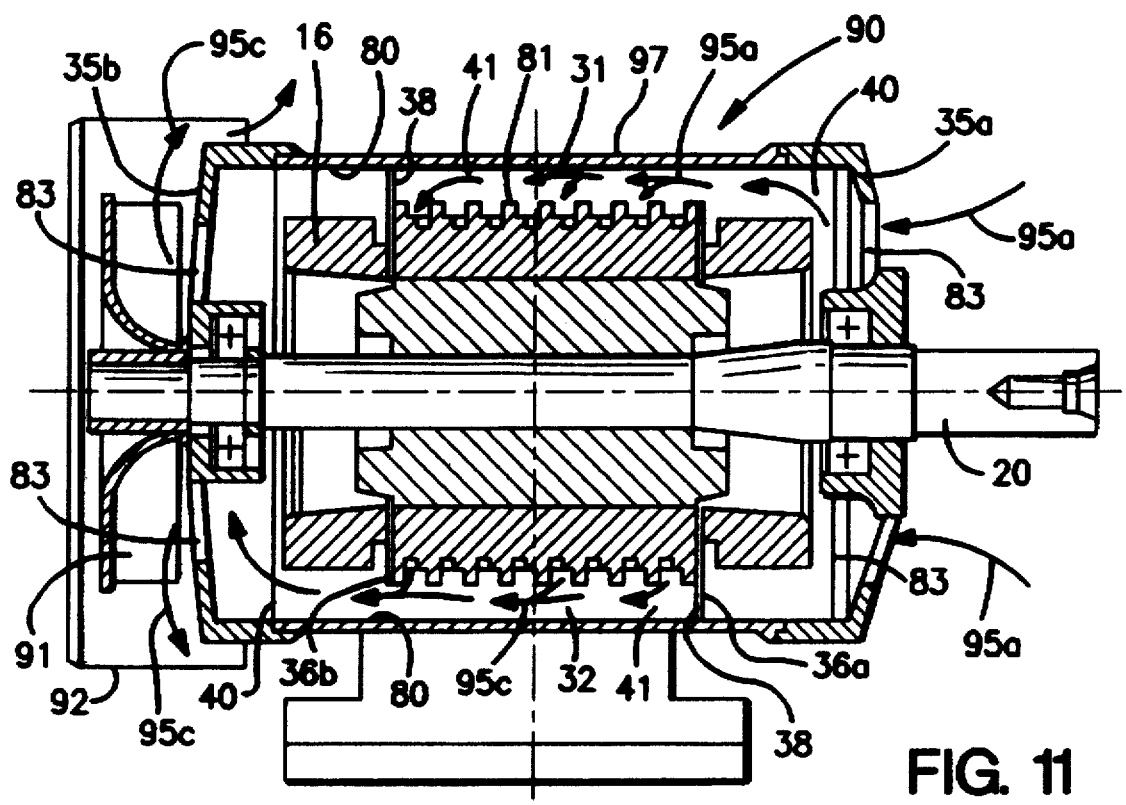
FIG. 11 is a longitudinal sectional view of the machine along planes XI—XI of FIG. 10.

In another embodiment of the motor according to the invention shown in FIGS. 9 to 11, the motor 90 comprises two adjacent channels 31, 32. In this case they also consist of the inner wall 80 of the housing 97 and the periphery 81 of the stator, and radial ribs 98 protruding inwards until the stator with respect to the inner wall 80.

The channels 31 of a first group and the other channels 32, making up a second group, are in direct communication with a cooling fluid inlet and outlet, respectively, consisting of openings 83 in the respective end flanges 35a and 35b of the motor.

The channels 31 and 32 are in communication through a first end 40 with the air inlet and outlet, respectively. They are sealed at a second end 41 opposite to the first end 40.

For this purpose, the stator has at least one of its ends an axial plate 36a, 36b made of a relatively soft, insulating and impermeable material, particularly a plastic material. These plates 36a, 36b, in this case two, have an inner radius substantially equal to the radius of the inner periphery of the stator. Each plate 36a, 36b is fixed to the plate 2 or, if applicable, to the group of end plates 2 of the stator, by suitable means passing through the thickness of this plate or of this group. For example, the plates 36a, 36b can be bolted. The plates extend at certain places 38 beyond the outer periphery of the stator so as to form the seals at the previously mentioned ends 41 of the channels 31, 32.

The sealed ends 41 of contiguous channels occupy opposite positions along the axial direction of the stator. In addition, the channels belong to the first and second groups of channels according to a spatial alternation of channels as shown in FIG. 10.

The motor 90 comprises in the prolongation of the flange 35b, outside of the housing 97, a fan 91 rigidly joined to the shaft 20 and arranged to create a depression sufficient to make the air circulate in the ventilation circuit which has just been described. A deflector 92 surrounding and protecting the fan 91 returns the air exiting the fan to the periphery of the housing 97.

The air circuit is thus the following. The depression created by the fan 91 forces air to enter through the openings 83 at the end 40 of the channels 31 (arrows 95a). Since the latter are sealed at their second end 41, the air penetrates transversally beneath the ribs 98 between the plates 2 on the periphery of the stator, as shown by the arrows 95b in FIG. 10, and reaches the contiguous channels 32. These are sealed at their ends 41 but are open at their ends 40 through which the heated air escapes in the direction of the fan 91 (arrows 95c). The air is finally evacuated by the deflector 92. The circulation of the air is shown by arrows 95a, 95b, 95c in FIGS. 9 to 11.

Figure 12:
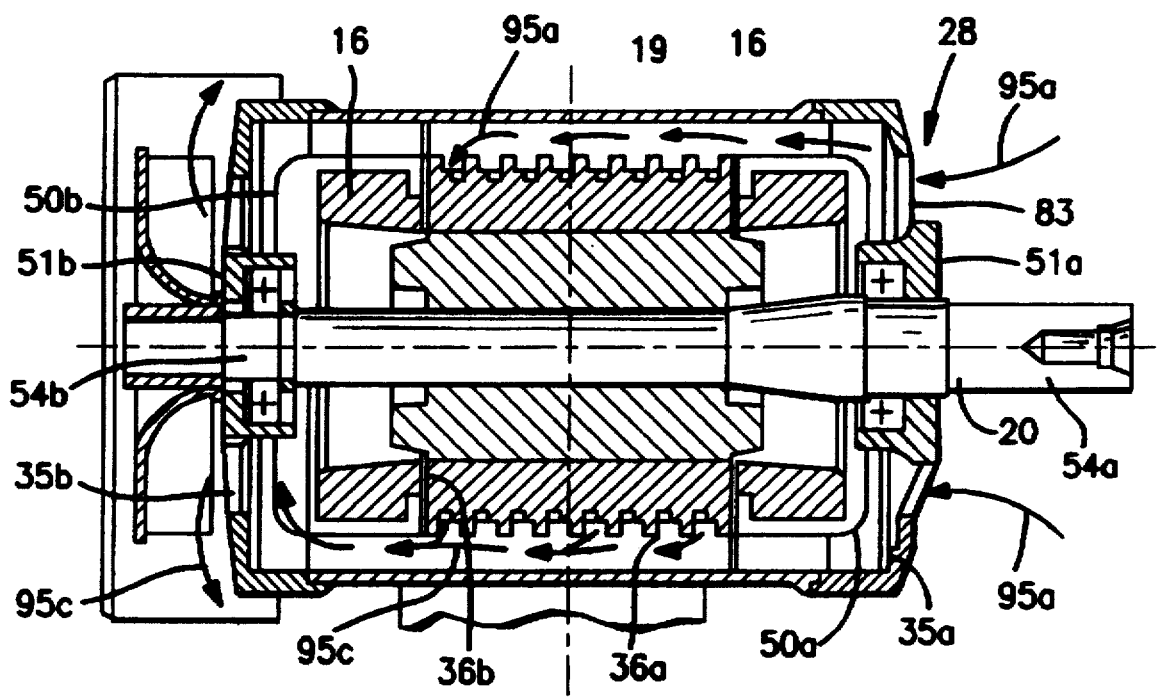
FIG. 12 is a view analogous to FIG. 11 of a third embodiment of the machine.

FIG. 12 shows another embodiment of the motor. The motor 28 of FIG. 12 is similar to that of FIG. 11 except for the fact that it comprises two circular covers 50a and 50b respectively connecting the end plates 36a and 36b to the bearings 51a and 51b. The latter connect each of the end flanges 35a, 35b to an end 54a, 54b of the shaft 20 of the motor. The covers 50a, 50b are configured so as to ensure an impermeable insulation of the rotor 19 and of the ends of the stator comprising the pieces 16 and the end-windings, with respect to the air circuit cooling the periphery of the stator. The covers 50a and 50b are made of a suitable material, of metal or plastic for example. The circulation of the air is identical to that described for FIGS. 9 to 11.

Figure 13:
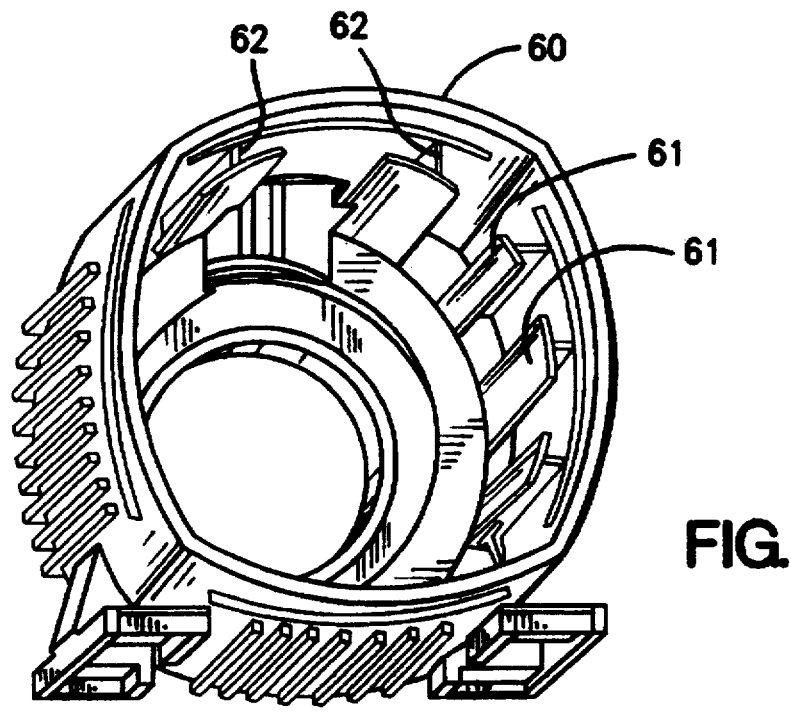
FIG. 13 is a perspective view of a housing according to a fourth embodiment of the machine.

FIG. 13 shows another embodiment of the housing of the motor according to the invention. The housing 60 comprises in its interior twelve bands 61 substantially parallel to the axis of the housing, spaced apart from one another and arranged to have their surface tangent to the periphery of the stator (not shown) and to be in contact with the latter once the latter is installed inside the housing 60. This band 61 is connected to the wall of the housing by a substantially radial longitudinal rib 62 having the same length as the band 61 in question. The bands 61 and the ribs 62 are continuous and impermeable to the cooling fluid outside of the stator, in this case air.

It will be understood that the respective shapes of the housings 18, 60 and 97 are suited for manufacture by moulding or pressure injection of a light metal or a fiber reinforced plastic material.

In either case, the housing can be designed so as to no longer have only the single function of separating the motor proper from the outer medium. The mechanical function usually fulfilled by a conventional housing is then entirely assumed by the end flanges which are then, in a known manner, fixed to each other by threaded rods which pass through tubular spacing elements suited for maintaining the flanges at a predetermined distance from each other.

Likewise, the flanges are suited for carrying the fixing lugs of the motor and all of the conventional fixtures of a motor which need not be listed here.

In the embodiment shown in FIGS. 14 to 18, the housing 100 is suited for being manufactured, either by moulding or pressure injection of a light metal or a fiber reinforced plastic material, or using a cut, rolled, welded and stamped plate.

The housing 100 has a generally cylindrical shape and includes on its periphery several elongated openings 101, six in the example shown.

The cylindrical wall 102 of the housing 100 is prolonged, from the peripheral edge 103 of each opening 101, by a continuous peripheral wall 104 having substantially the shape of a truncated pyramid narrowing towards the interior of the housing, until an inner peripheral edge 105 substantially externally tangent to the stator 1 and defining at the stator an inner opening 106.

The axial length of the inner opening 106 is substantially equal to that of the stator, so that the openings 106 play the part of the openings 26 of the housing 18 in FIGS. 5 to 8. Like the walls 96 of the housing 18, the continuous peripheral wall 104 of each opening 101, 106 separates the latter (see FIG. 16) from the two adjacent longitudinal channels 21 which are themselves defined by the wall 102 of the housing 100 and the wall 104 of the adjacent openings. This wall 104 forces the air sucked in through this opening to pass transversally beneath the inner peripheral edge 105 between the truncated corners 5 of the shifted plates 2, before reaching the corresponding channel 21.

The housing 100 is suited for receiving at its axial ends flanges 107a, 107b, the conventional mechanical function of the housing being fulfilled either by the housing 100, or by said flanges 107a, 107b.

Of course, the invention is not limited to the embodiments which have just been described and these can be modified or improved in various ways without departing from the scope of the invention.

It is thus possible to replace the weld points with soldering points or glue points, to replace the arcs of a circle 6 with concave and/or convex polygonal contours symmetrical with respect to the bisector of said corner so as to be prolonged or superposed, or to provide the stator 1 with a peripheral surface of a shape other than that of a revolving cylinder.

The lines of weld points 15a, 15b need not be regularly distributed about the axis 4 of the stator 1, 3, as long as the respective angular positions of the weld points are predetermined and cyclically reproducible.

I claim:

1. A slotted wound stator (1, 3) for an electrical rotating machine, comprising:

a plurality of slots;

metal plates (2) superposed face-to-face;

each plate (2) displaying an angular displacement from a following adjacent plate (2), with respect to an axis (4) of the stator (1, 3), of a constant angle ($\alpha$) equal to a multiple of a pitch angle corresponding to a pitch of the plurality of slots;

each plate (2) substantially having a shape of a regular polygon, more particularly of a square, each corner (5) of which is truncated according to a circular contour (6), or approximately a circular contour, symmetrical with respect to a bisector of said corner (5), identical for all corners (5), and corresponding to a sector of a circle whose angle at the center is at least as large as said constant angle ($\alpha$);

a distance with respect to the axis (4) of the stator (1, 3) and the shape of said contour being determined by the constant angle ($\alpha$) such that, projected onto a plane perpendicular to the axis (4) of the stator (1, 3), the contour (6) of a plate (2) substantially prolongs a successive contour (6) of a successive adjacent plate (2) or is partially superposed on said successive contour (6);

at least one of every two truncated corners (5) of each plate (2) being connected to a corner (5) of a previous adjacent plate (2) at a welding point and to a corner of a successive adjacent plate (2) at a different welding point (11), which is at a circumferential distance from a location of the welding point between the plate and the previous adjacent plate and wherein each welding point links only two plates together;

the weld points (11) being located in predetermined and cyclically reproducible respective angular positions with respect to the axis (4) of the stator (1, 3) and being distributed in a substantially regular fashion about the axis (4) so that the weld points (11) are aligned along lines (15a, 15b) of weld points (11) substantially parallel to the axis (4) of the stator (1, 3).

2. A stator according to claim 1, characterised in that each plate (2) is replaced with a pack comprising at least two individual superposed plates (2) of identical shapes.

3. A stator (1; 3) according to claim 1, characterised in that each plate (2) is slightly scalloped (9) at each weld point (11).

4. A stator according to claim 1, characterised in that the lines (15a, 15b) of weld points (11) are regularly distributed about the axis (4) of the stator (1; 3).

5. A stator according to claim 1, wherein the plurality of slots are provided on an inner face of the stator displaying an inclination with respect to the axis (4) of the stator (1, 3), and the lines (15a, 15b) formed by the corresponding weld points (11) have the shape of a blade displaying the same angle of inclination with respect to the axis (4) of the stator (1, 3).

6. A stator (1, 3) according to claim 1, further comprising: at at least one of the stator's ends, an axial plate (36a, 36b) made of a relatively soft, insulating and impermeable material having an inner radius substantially equal to a radius of an inner periphery of the stator (1, 3), the axial plate (36a, 36b) being fixed to an end plate (2) of the stator (1, 2) by means passing through a thickness of the end plate (2).

7. An electrical rotating machine (17, 90, 28) comprising:
a stator (1, 3) having
a plurality of slots;
metal plates (2) superposed face-to-face;
each plate (2) displaying an angular displacement from a following adjacent plate (2), with respect to an axis (4) of the stator (1, 3), of a constant angle ($\alpha$) equal to a multiple of a pitch angle corresponding to a pitch of the plurality of slots;
each plate (2) substantially having a shape of a regular polygon, more particularly of a square, each corner, (5) of which is truncated according to a circular contour (6), or approximately a circular contour, symmetrical with respect to a bisector of said corner (5), identical for all corners (5), and corresponding to the sector of a circle whose angle at the center is at least as large as said constant angle ($\alpha$);
a distance with respect to the axis (4) of the stator (1, 3) and the shape of said contour being determined by the constant angle ($\alpha$) such that, projected onto a plane perpendicular to the axis (4) of the stator (1, 3), the contour (6) of a plate (2) substantially prolongs a successive contour (6) of a successive adjacent plate (2) or is partially superposed on said successive contour (6);
at least one of every two truncated corners (5) of each plate (2) being connected to a corner (5) of a previous adjacent plate (2) at a welding point and to a corner of a successive adjacent plate (2) at a different welding point (11), which is at a circumferential distance from a location of the welding point between the plate and the previous adjacent plate and wherein each welding point links only two plates together;
the weld points (11) being located in predetermined and cyclically reproducible respective angular positions with respect to the axis (4) of the stator (1, 3) and being distributed in a substantially regular fashion about the axis (4) so that the weld points (11) are aligned along lines (15a, 15b) of weld points (11) substantially parallel to the axis (4) of the stator (1, 3).

8. A machine according to claim 7, further comprising a plurality of longitudinal channels (21, 31, 32) formed on a periphery of the stator (1, 3) substantially parallel to the axis (4), said plurality of channels (21, 31, 32) being open on a stator side (1, 3) and being in direct communication with a cooling fluid inlet or outlet.

9. A machine according to claim 8, wherein a group of channels of said plurality of channels (21, 31, 32) is in communication with the fluid inlet or outlet through respective channel ends (40) of said group.

10. A machine according to claim 8, characterised in that the channels (31, 32) are adjacent and in that the channels (31) of a first group and the other channels (32), making up a second group, are in direct communication with a cooling fluid inlet and outlet, respectively.

11. A machine according to claim 10, characterised in that the channels (31, 32) are in communication through a first end (40) with the air inlet an outlet, respectively, and are sealed at a second end (41) opposite to the first end (40).

12. A machine according to claim 11, characterised in that the sealed second ends (41) of contiguous channels (31, 32) occupy opposite positions along the axial direction of the stator (1; 3).

13. A machine according to claim 10, characterised in that the channels (31, 32) belong to the first and second groups of channels, respectively, according to a spatial alternation of channels (31, 32).

14. A machine according to claim 8, characterised in that at least one portion (22; 80) of the wall of the channels (21; 31, 32) consists of the wall of the housing.

15. A machine according to claim 8, characterised in that the channels (21) are spaced apart from one another.

16. A machine according to claim 15, wherein a portion of the stator (1, 3) located between two immediately neighboring channels (21) is at least partially in contact with an ambient medium of the machine, and a housing (18, 100) of the machine has in front of said portion of the stator (1, 3) at least one traversing oval opening (26, 106) with edges (96, 105) substantially tangent to the stator (1, 3), said at least one opening (26, 106) extending substantially along an entire axial length of the stator (1, 3).

17. A machine according to one of claim 8, characterised in that the cooling fluid outlet is associated with fluid depression means (23a, 23b; 91).

18. A machine according to claim 8, characterised in that the housing has a shape suited for being manufactured by moulding or pressure injection of a light metal or a fiber reinforced plastic material, or for being manufactured using a cut, rolled, welded and stamped plate.

19. A method for manufacturing a stator (1, 3) having
a plurality of slots;
metal plates (2) superposed face-to-face;
each plate (2) displaying an angular displacement from a following adjacent plate (2), with respect to an axis (4) of the stator (1, 3), of a constant angle ($\alpha$) equal to a multiple of a pitch angle corresponding to a pitch of the plurality of slots;
each plate (2) substantially having a shape of a regular polygon, more particularly of a square, each corner (5) of which is truncated according to a circular contour (6), or approximately a circular contour, symmetrical with respect to a bisector of said corner (5), identical for all corners (5), and corresponding to the sector of a circle whose angle at the center is at least as large as said constant angle ($\alpha$);
a distance with respect to the axis (4) of the stator (1, 3) and the shape of said contour being determined by the constant angle ($\alpha$) such that, projected onto a plane perpendicular to the axis (4) of the stator (1, 3), the contour (6) of a plate (2) substantially prolongs a successive contour (6) of a successive adjacent plate (2) or is partially superposed on said successive contour (6);
at least one of every two truncated corners (5) of each plate (2) being connected to a corner (5) of a previous adjacent plate (2) at a welding point and to a corner of a successive adjacent plate (2) at a different welding point (11), which is at a circumferential distance from a location of the welding point between the plate and the previous adjacent plate and wherein each welding point links only two plates together;

the weld points (11) being located in predetermined and cyclically reproducible respective angular positions with respect to the axis (4) of the stator (1, 3) and being distributed in a substantially regular fashion about the axis (4) so that the weld points (11) are aligned along lines (15a, 15b) of weld points (11) substantially parallel to the axis (4) of the stator (1, 3), comprising the following successive steps:

cutting plates (2) with the shape of a regular polygon, particularly a square, each corner (5) of which is truncated according to a predetermined contour (6);

piling up the plates (2) face-to-face shifting each plate (2) from a previously piled plate (2) by said constant angle ($\alpha$); and welding at least one of every two truncated corners (5) of each plate (2) to a corresponding respective truncated corner of each of two adjacent plates (2) by at least one weld point (11).

20. A method according to claim 19, wherein the welding step comprises displacing one of a plurality of activated welding heads (70), relative to the stator (1, 3), at a surface of the stator (1, 3), along continuous trajectories (15a, 15b) substantially parallel to the axis (4), these trajectories being arranged to weld at least one of every two truncated corners of each plate by at least one weld point (11) to the corresponding corner of each of the adjacent plates (2).

21. A method according to claim 20, wherein a number n of trajectories (15a, 15b) is even and twice a number of welding heads in said plurality of welding heads (70), and the welding step further comprises the following successive steps:

welding by simultaneously displacing the n/2 activated welding heads (70) relative to the stator (1, 3) at the surface of the stator (1, 3) along n/2 first trajectories (15a);

removing the plurality of activated welding heads (70) from the axis (4) relative to the stator (1, 3);

displacing the plurality of activated welding heads (70) relative to the stator (1, 3) rotating a angle ($\beta$) about the axis (4) of the stator (1, 3);

bringing back the plurality of activated welding heads (70) up to the surface of the stator (1, 3); and welding by simultaneously displacing the plurality of activated welding heads (70) relative to the stator (1, 3) along n/2 last trajectories (15b).

22. A manufacturing method according to claim 21, characterised in that the heads (70) travel the first trajectories (15a) in a first direction along the axial direction of the stator (1; 3) and they travel the last trajectories (15b) in the direction opposite to the first direction.

23. A manufacturing method according to claim 19 characterised in that the pressing of the plates (2) against each other is ensured by the insulating sleeves at the bottom of the slots of the stator (1; 3).

* * * * *